(12) United States Patent
Kwon (10) Patent No.: US 7,465,062 B2
(45) Date of Patent: Dec. 16, 2008

(54) BACKLIGHT ASSEMBLY WITH SUPPORTING MEMBER AND DISPLAY DEVICE HAVING THE SAME

(75) Inventor: Dal-Jung Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 120 days.

(21) Appl. No.: 11/270,948

(22) Filed: Nov. 11, 2005

(65) Prior Publication Data

US 2006/0104083 A1 May 18, 2006

(30) Foreign Application Priority Data

Nov. 12, 2004 (KR) .................. 10-2004-0092608

(51) Int. Cl.
*F21S 4/00* (2006.01)
*G02F 1/1333* (2006.01)

(52) U.S. Cl. .................. 362/225; 362/330; 349/58; 349/60

(58) Field of Classification Search ......... 362/559–561, 362/330, 225, 224, 632–634, 367, 33, 382; 349/58, 60, 61, 65
See application file for complete search history.

(56) References Cited

U.S. PATENT DOCUMENTS 6,902,300 B2 *  6/2005  Lee ............................ 362/306
7,070,313 B2 *  7/2006  Kim et al. .................... 362/561
2004/0257792 A1 * 12/2004  Yu et al. ....................... 362/31

FOREIGN PATENT DOCUMENTS

| JP | 07064084 | 3/1995 |
|---|---|---|
| JP | 08054628 | 2/1996 |
| JP | 10039280 | 2/1998 |
| JP | 2003346541 | 12/2003 |
| KR | 1020020029842 | 4/2002 |
| KR | 1020020067655 | 8/2002 |
| KR | 1020040005495 | 1/2004 |
| KR | 1020040046243 | 6/2004 |
| TW | 591300 B | 6/2004 |

\* cited by examiner

*Primary Examiner*—Bao Q Truong
(74) *Attorney, Agent, or Firm*—Cantor Colburn LLP (57) ABSTRACT

A backlight assembly with an improved supporting member and a display device having the backlight assembly is provided. The backlight assembly includes a lamp for emitting light, a supporting member including a base plate and a support fixed on the base plate and extending in a light emitting direction with a predetermined height, wherein an upper portion of the support supports an upper portion of the backlight assembly while contacting the upper portion of the backlight assembly.

22 Claims, 11 Drawing Sheets

# BACKLIGHT ASSEMBLY WITH SUPPORTING MEMBER AND DISPLAY DEVICE HAVING THE SAME

The application claims priority to Korean patent application No. 2004-0092608 filed on Nov. 12, 2004, and all the benefits accruing therefrom under 35 U.S.C. §119, the contents of which are herein incorporated by reference in their entirety.

BACKGROUND OF THE INVENTION (a) Field of the Invention

The present invention relates to a backlight assembly having an improved supporting member and a display device provided with the backlight assembly, and more particularly, to a backlight assembly having a supporting member whose structure supports an upper portion of the backlight assembly and a display device provided with the backlight assembly.

(b) Description of the Related Art

In semiconductor technologies, liquid crystal display (LCD) devices have been decreased in size and weight and enhanced in performance, and demands for such display devices have increased explosively.

LCD devices employing an LCD panel have advantages such as small size, small weight, and low power consumption, and have become attractive as a substitute for cathode ray tubes (CRTs). LCD devices are used in almost all information processing apparatuses requiring a display device.

The LCD devices change a specific molecular alignment of liquid crystal to different molecular alignments with the application of a voltage and convert a change in optical characteristics, such as birefringence, optical rotary power, dichroism, and optical scattering, of liquid crystal cells emitting light due to the change in molecular alignment into a visual change. That is, the LCD device is a light receiving display device which displays data using modulation of light in the liquid crystal cells.

Display devices such as LCD devices are now applied to digital televisions having a screen size of 42 inches or more. The increase in size of the LCD devices increases the sizes of components of the LCD devices. For example, the backlight assembly for supplying light to an LCD panel is gradually enlarged. Therefore, the areas of optical sheets and a diffusing plate, which are positioned in the upper portion of the backlight assembly and enhance the brightness of light, are gradually increased.

The optical sheets and the diffusing plate are provided inside the backlight assembly by fixing the edges thereof. As the areas of the optical sheets and the diffusing plate are gradually increased, their middle portions have a tendency to sink or sag. The sinking phenomenon has a negative effect on the brightness of light, and in addition, the definition of an image is thus reduced due to deterioration in light characteristics.

In order to solve these problems, a cone-shaped support is provided on the bottom surface of the backlight assembly to support the upper portion of the backlight assembly. The sinking of the optical sheets and the diffusing plate can be prevented in this way. When the upper portion of the backlight assembly is supported by the cone-shaped support, point-shaped spots are generated at the time of assembling the panel, quality testing, and reworking.

In addition, since the cone-shaped support has no elasticity, the stress resulting from the cone-shaped support acts on internal components of the backlight assembly at the time of movement of the components due to conveyance and so on. Therefore, the stress generates pressure, thereby damaging or scratching the internal components.

SUMMARY OF THE INVENTION

The present invention is contrived to remedy the above-mentioned disadvantages and the present invention provides a backlight assembly with a supporting member of improved structure to prevent an upper portion of the backlight assembly from sinking.

The present invention also provides a display device provided with the backlight assembly with a supporting member whose structure is improved as described above.

In an exemplary embodiment, a backlight assembly is provided including a lamp for emitting light, a supporting member including a base plate and a support fixed on the base plate and extending in the light emitting direction with a predetermined height. An upper portion of the support supports an upper portion of the backlight assembly while contacting the upper portion of the backlight assembly.

In another exemplary embodiment, the support may include a pair of curved portions supporting the upper portion of the backlight assembly, a pair of straight portions connected to the lower end of the curved portions and extending to the base plate and a fixing portion connected to a lower end of the straight portions and fixed to the base plate.

In another exemplary embodiment, the pair of curved portions may be spaced from each other and the pair of straight portions may be spaced from each other.

In another exemplary embodiment, a radius of curvature of the curved portions may be in the range of 1 mm to 100 mm.

In another exemplary embodiment, the pair of curved portions may be curved in opposite directions.

In another exemplary embodiment, the pair of straight portions may form a tilt angle about the base plate and a distance between the pair of straight portions may be gradually increased as a distance from the fixing portion is increased.

In another exemplary embodiment, the tilt angle may be in the range of 60° to 120°.

In another exemplary embodiment, a reinforcement board may be attached onto the back surface of the curved portions.

In another exemplary embodiment, optical sheets and a diffusing plate may be provided in the upper portion of the backlight assembly and the support may come in contact with the diffusing plate.

In another exemplary embodiment, the supporting member may further include a lamp fixing portion disposed on the base plate and fixing the lamp in place.

In another exemplary embodiment, the lamp fixing portion may include a pair of lamp inserting portions, widened in order to insert the lamp, and a lamp support that connects both ends of the pair of lamp inserting portions, the lamp support supporting and enclosing the lamp.

In another exemplary embodiment, the support may include a pair of curved portions which support the upper portion of the backlight assembly and are spaced apart from each other, a pair of straight portions which are connected to the lower ends of the pair of curved portions and are connected to each other at the lower ends thereof as a distance between the pair of curved portions is narrowed, and a fixing portion, which is connected to the lower ends of the pair of straight portions that extend to the base plate, and which is fixed to the base plate.

In another exemplary embodiment, the support may include a pair of curved portions spaced from each other while supporting the upper portion of the backlight assembly, and a pair of straight portions that are connected to the lower ends of the pair of curved portions, are connected to each other at the lower ends thereof as a distance between the pair of curved portions is narrowed, and which are fixed to the base plate.

In another exemplary embodiment, the support may include a curved portion supporting the upper portion of the backlight assembly, a first straight portion which is connected to the lower end of the curved portion and which extends to the base plate, a second straight portion which is connected to the lower end of the first straight portion and which extends parallel to the base plate, and a fixing portion connected to the lower portion of the second straight portion and fixed to the base plate.

In another exemplary embodiment, the support may include a curved portion, which supports the upper portion of the backlight assembly, that is formed in a circular shape, one side of which is open, and a fixing portion connected to the lower portion of the curved portion and fixed to the base plate.

In another exemplary embodiment, the upper portion of the support may be curved to extend in the width direction of the base plate.

In another exemplary embodiment, the support may include a curved portion supporting the upper portion of the backlight assembly, a straight portion which is connected to the lower end of the curved portion and which extends to the base plate, and a fixing portion which is connected to the lower end of the straight portion and fixed to the base plate.

In another exemplary embodiment, the upper portion of the support may be curved to extend in the longitudinal direction of the base plate.

According to another aspect of the present invention, a display device is provided including a panel unit displaying an image, and a backlight assembly supplying light to the panel unit. The backlight assembly includes a lamp for emitting light, and a supporting member. The supporting member includes a base plate and a support which is fixed on the base plate and extends in the light emitting direction with a predetermined height. An upper portion of the support supports an upper portion of the backlight assembly while plane contacting the upper portion of the backlight assembly.

In another exemplary embodiment, the support may include a curved portion supporting the upper portion of the backlight assembly, a straight portion that is connected to the lower end of the curved portion and which extends to the base plate and a fixing portion which is connected to the lower end of the straight portion and fixed to the base plate.

In another exemplary embodiment, the pair of curved portions may be spaced from each other and the pair of straight portions may be spaced from each other.

In another exemplary embodiment, the curved portion may include a pair of curved portions which are spaced from each other and the straight portion may include a pair of straight portions which are spaced from each other.

In another exemplary embodiment, the pair of curved portions may be curved in opposite directions.

In another exemplary embodiment, optical sheets and a diffusing plate may be provided in the upper portion of the backlight assembly and the support may come into contact with the diffusing plate.

In another exemplary embodiment, the pair of straight portions may form a tilt angle about the base plate and a distance between the pair of straight portions may be gradually increased as a distance from the fixing portion is increased.

In another exemplary embodiment, the panel unit may be a liquid crystal display panel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to FIGS. 1 to 11. The embodiments of the present invention are intended only to exemplify the present invention, and thus the present invention is not limited to the embodiments.

Figure 1:
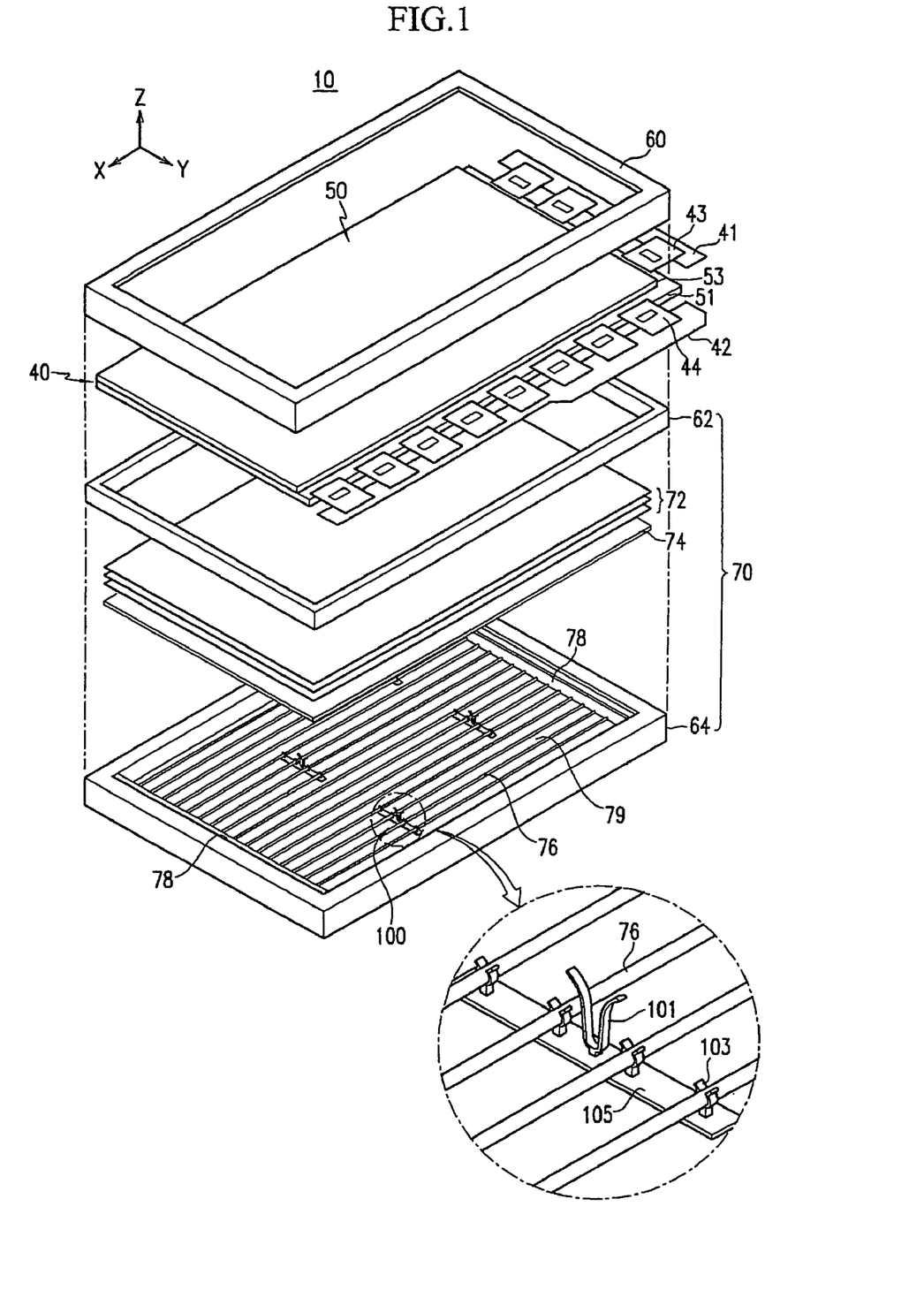
FIG. 1 is an exploded perspective view of an exemplary embodiment of a display device provided with a backlight assembly according to the present invention.

FIG. 1 shows an exemplary embodiment of a display device 10. The display device 10 may be used in large-size TVs.

A structure of the display device 10 shown in FIG. 1 is intended only to exemplify the present invention, and thus the present invention is not limited to this. Therefore, the present invention may be applied to a display device of a different structure. Further, an exemplary embodiment of an LCD panel as an example of a panel unit 50 is shown in FIG. 1, but this is intended only to exemplify the present invention, and thus the present invention is not limited to this. Therefore, other types of light receiving panel units may be used.

As shown in FIG. 1, the display device 10 includes a backlight assembly 70 for supplying light and a panel unit assembly 40 for displaying images. A panel unit assembly 40 includes a panel unit 50, driver integrated circuit packages (driver IC packages) 43 and 44 connected to the panel unit 50 for transmitting a driving signal, and printed circuit boards (PCBs) 41 and 42. In exemplary embodiments, the driver IC packages may be a chip on film (COF) or a tape carrier package (TCP).

The panel unit 50 includes a TFT panel 51 consisting of a plurality of thin film transistors (TFTs), a color filter panel 53 positioned in an upper portion of the TFT panel 51, and liquid crystal (not shown) injected between these panels. A polarizer (shown in FIG. 3) is attached in an upper portion of the color filter panel 53 and a lower portion of the TFT panel 51 and polarizes light passing the panel unit 50.

In exemplary embodiments, the TFT panel 51 may be a transparent glass panel in which a thin film transistor of a matrix shape may be formed. A data line (not shown) may be connected to a source terminal (not shown). A gate line (not shown) may be connected to a gate terminal (not shown). A pixel electrode (not shown) that may include transparent indium tin oxide (ITO) as a conductive material may be formed in a drain terminal (now shown).

An electrical signal from the PCB 42 may be input to the data line and the gate line of the panel unit 50. The electrical signal may then be input to the source terminal and the gate terminal of the TFT. The TFT may be turned on or off by the input of the electrical signal, whereby the electrical signal required in forming the pixel is output to the drain terminal.

Referring to FIG. 1, the color filter panel 53 is arranged on the TFT panel 51. The color filter panel 53 may be a panel in which a RGB pixel is formed by a thin film process. The RGB pixel may be a color pixel that reveals a predetermined color when light passes through the pixel. In exemplary embodiments, a common electrode (not shown) that may include ITO, may be coated on a front surface of the color filter panel 53. Power applied to the gate terminal and the source terminal of the TFT and the thin film transistor is turned on. An electric field may be formed between a pixel electrode and the common electrode of the color filter panel 53. An array angle of liquid crystal injected between the TFT panel 51 and the color filter panel 53 may be changed by the electric field. Light transmittance may be changed by the changed array angle, whereby a desired pixel may be obtained.

The PCBs 41 and 42 for receiving a video signal from the outside of the panel unit 50 and applying a driving signal to the data line and the gate line are connected to the respective drive IC packages 43 and 44 attached to the panel unit 50. The data PCB 42 is connected to a control board (not shown). The data PCB 42 generates a data driving signal, a gate driving signal, and a plurality of driving signals for applying, in proper time, these signals for driving the panel unit 50. The data PCB 42 allows the gate driving signal and the data driving signal to apply to the respective gate line and data line of the panel unit 50 through the driver IC packages 43 and 44.

Referring to FIG. 1, a backlight assembly 70 includes optical sheets 72, a diffusing plate 74, a plurality of lamps 76, a frame mold side 78, and a reflecting sheet 79. The backlight assembly 70 may be fixed by a mold frame 62 and a bottom chassis 64. The bottom chassis 64 receives the optical sheet 72, the diffusing plate 74, the plurality of lamps 76, the frame mold side 78, and the reflecting sheet 79. The plurality of lamps 76 may be disposed apart by a predetermined distance and received to the bottom chassis 64.

The diffusing plate 74 evenly diffuses light emitted from the plurality of lamps 76. Advantageously, it is possible to prevent a bright line from being generated by the plurality of lamps 76. The reflecting sheet 79 reflects light emitted from the plurality of lamps 76 to an upper portion. The optical sheets 72 may improve the brightness of the light. The frame mold side 78 fixes both ends of a plurality of lamps 76 at once.

As shown in the enlarged circle shown in FIG. 1, the supporting member 100 is installed together with the plurality of lamps 76 inside of the backlight assembly 70. The supporting member 100 may include a base plate 105 and a support 101. The support 101 may be fixed to the base plate 105 and support the diffusing plate 74 and the optical sheets 72 positioned in the upper portion of the backlight assembly 70. In exemplary embodiments, the supporting member 100 may further include a lamp fixing portion 103. The lamp fixing portion 103 may be disposed apart from the support 101 on the base plate 105 and fix the plurality of lamps 76. A projecting portion 107 (shown in FIG. 3) for fixing the base plate 105 may be formed in a lower portion of the base plate 105 and inserted into the bottom chassis 64. The base plate 105 may be firmly fixed in the bottom chassis 64.

A shape of the supporting member 100 shown in the enlarged circle of FIG. 1 is intended only to exemplify the present invention, and thus the present invention is not limited to this. The supporting member 100 may be changed to other forms and shapes. As shown in the enlarged circle of FIG. 1, the support 101 has a predetermined height and/or thickness and extends along the light emitting direction (Z axis direction). The support 101 may be configured to be in contact with an optical plate or sheet at the upper portion of the backlight assembly 70.

In exemplary embodiments, the upper portion of the support 101 may be curved in the longitudinal direction of the base plate 105 such that the upper portion of the support 101 elastically supports the upper portion of the backlight assembly 70. The upper portion of the support 101 may contact with an upper surface of the backlight assembly 70, thereby having a wide contact area compared to a point contact. The upper portion of the backlight assembly 70 may be efficiently supported. Advantageously, if internal parts move during conveyance of the backlight assembly 70, the upper portion of the backlight assembly 70 may be elastically supported by the curved upper portion of the support 101, and an impact caused due to the movement may be assimilated, or effectively reduced. The upper portion of the backlight assembly 70 may be hardly damaged because the impact caused by the movement is assimilated. Sinking in the X axis direction of the upper portion of the backlight assembly 70 may also be prevented, or effective reduced because the support 101 is formed along the width direction (Y axis direction) of the lamp 76.

In exemplary embodiments, an inverter (not shown) and a control board (not shown) may be provided on the back surface of the bottom chassis 64. The inverter transforms external power to a fixed voltage level and the changed voltage is supplied to the lamp 76. The control board connected to the PCB 42 may convert analog data signals to digital data signals and supplies it to the panel unit 50.

Referring to FIG. 1, the panel unit assembly 40 is fixed on the backlight assembly 70 using the top chassis 60.

Figure 2:
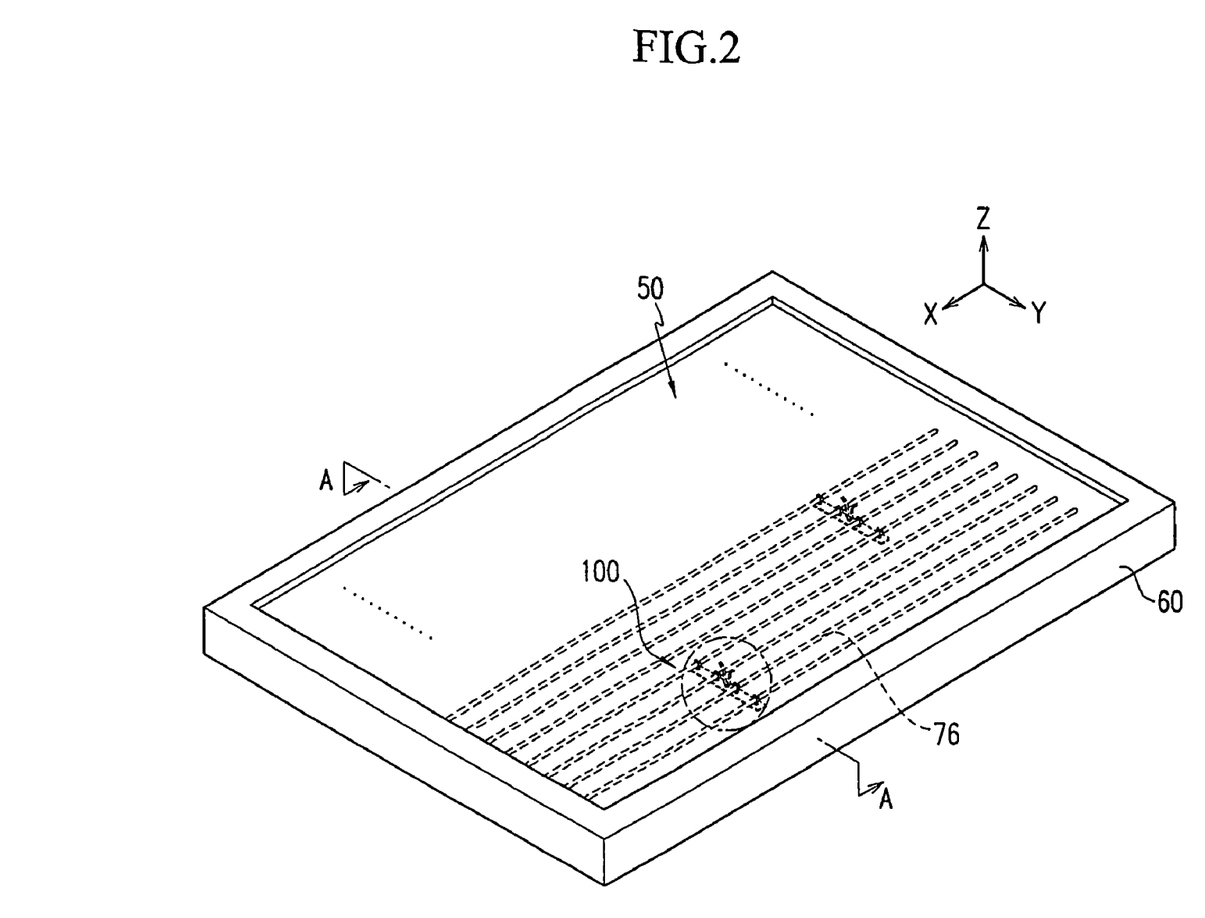
FIG. 2 is an assembled perspective view of the display device shown in FIG. 1.

FIG. 2 is a diagram illustrating an assembled perspective view of the display device 10 shown in FIG. 1.

As shown in FIG. 2, a length (in the X axis direction) of the plurality of lamps 76 may be lengthened as a size of the display device 10 is increased. Commensurately, an area of other internal parts may also be increased. To accommodate the increasing lengths of the lamps 76, the supporting member 100 is installed together with the plurality of lamps 76 to prevent sinking at a middle portion of the display device 10. In exemplary embodiments, one or more supporting members 100 may be provided in the bottom chassis. In alternative embodiments, the upper portion of the backlight assembly may be prevented from sinking by arranging the supporting members 100 zigzag in a middle portion of the bottom chassis.

Figure 3:
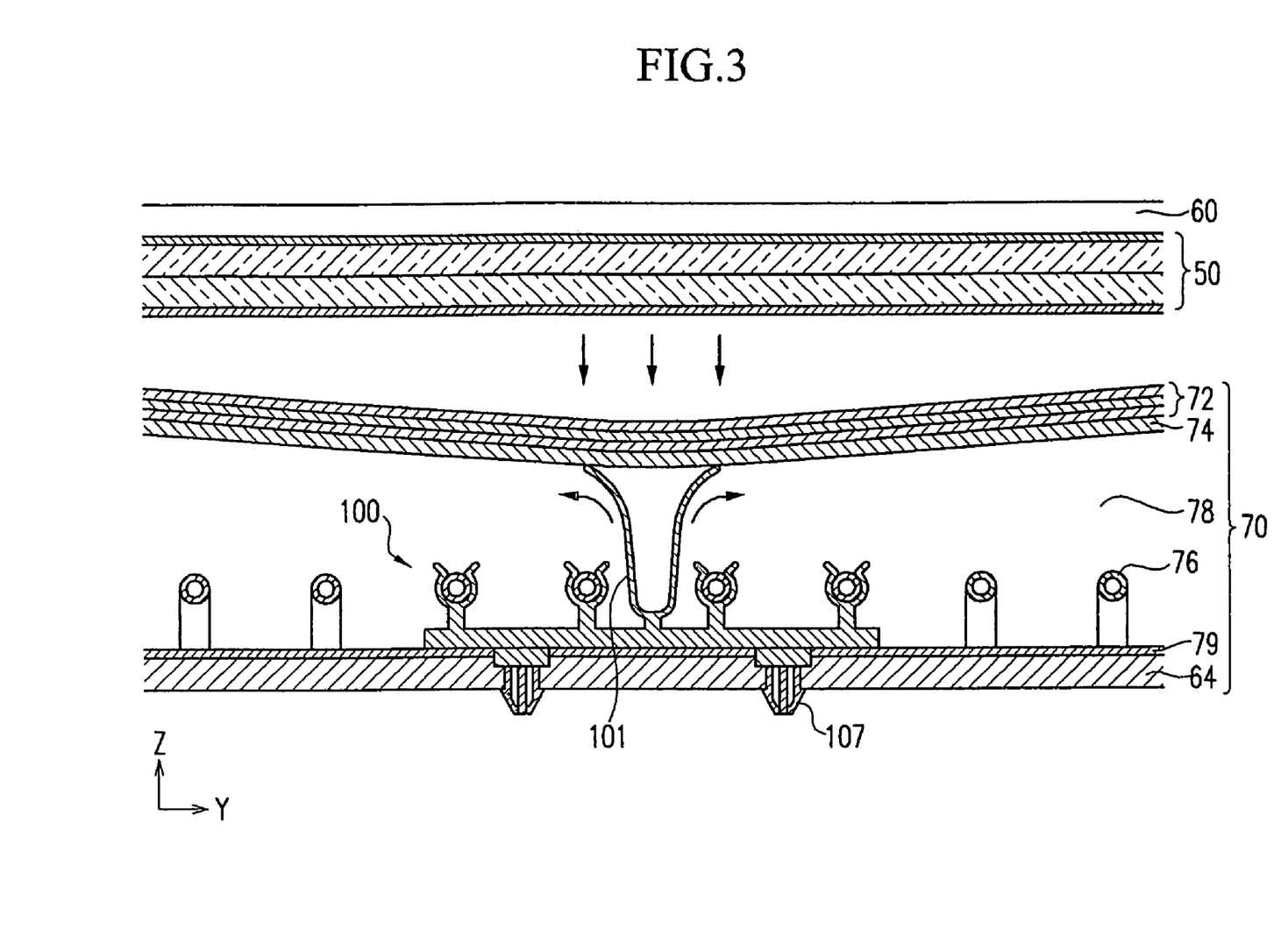
FIG. 3 is a cross-sectional view taken along line M shown in FIG. 2.

FIG. 3 shows the display device 10 taken along line AA shown in FIG. 2. An operation state of the supporting member 100 provided inside the backlight assembly 70 is schematically shown in FIG. 3.

As shown in FIG. 3, optical sheets 72 and a diffusing plate 74 are provided in the upper portion of the backlight assembly 70. The diffusing plate 74 is positioned below the optical sheets 72 and is supported by the supporting member 100. The upper portion structure of the backlight assembly 70 shown in FIG. 3 is intended only to exemplify the present invention, and thus the present invention is not limited to this. In exemplary embodiments, other internal parts in addition to the optical sheet 72 and the diffusing plate 74 may be provided. In alternative embodiments, these additional internal parts may also be supported by the supporting member 100.

As indicated by the downward arrows shown in FIG. 3, a middle portion of the display device 10 is sunken to a lower part by gravity because areas of the optical sheets 72 and the diffusing plate 74 are large. The upper portion of the support 101 provided in the supporting member 100 is curved and elastically deformed in the curved arrow direction. Advantageously, the support 101 may act like a spring to efficiently prevent, or effectively reduce the sinking of the optical sheets 72 and the diffusing plate 74. The support 101 may perform a vibration-absorbing operation even when the diffusing plate 74 is moved by the conveyance of the display device 10. As a further advantage, the optical sheets 72 and the diffusing plate 74 may be elastically supported.

Figure 4:
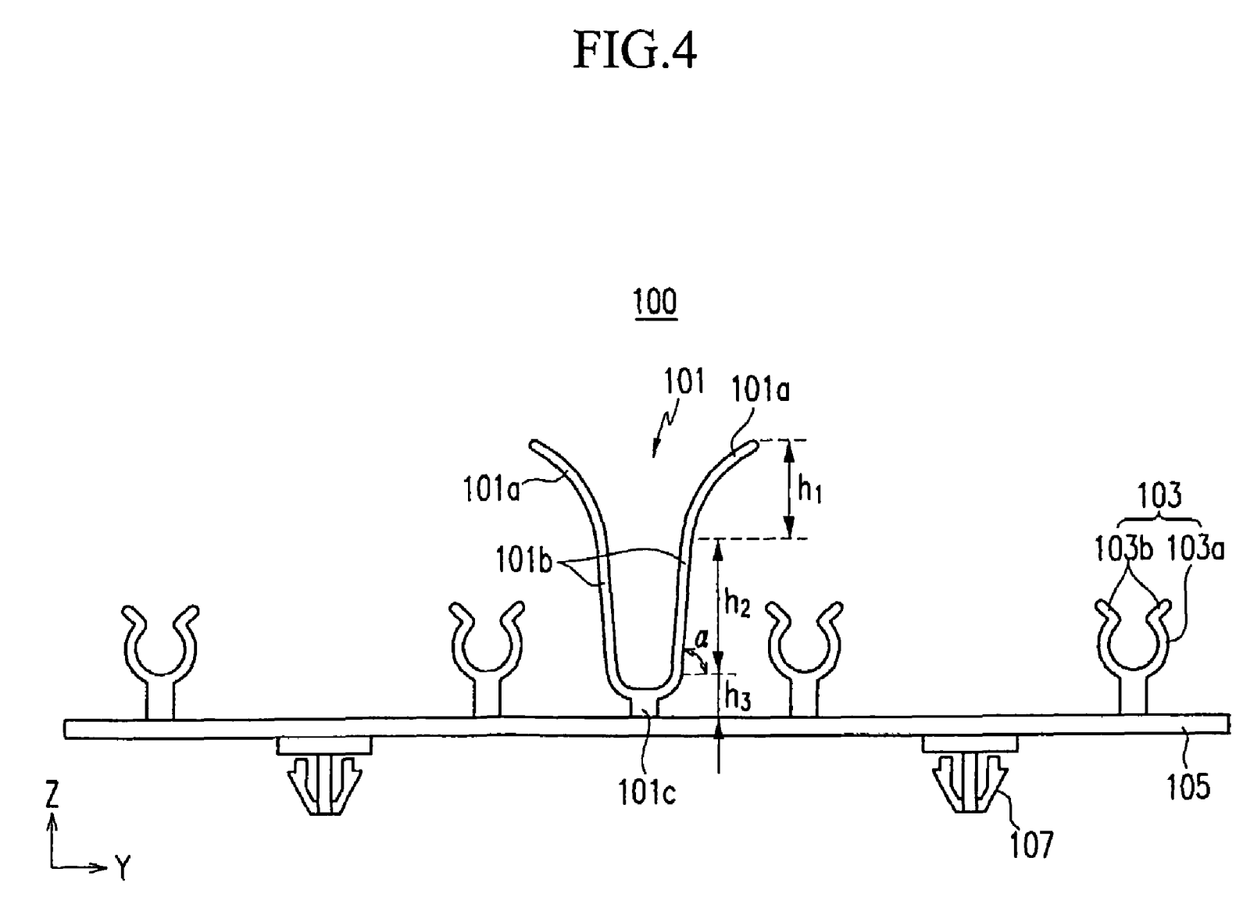
FIG. 4 is a diagram schematically illustrating an exemplary embodiment of a supporting member provided in the backlight assembly according to the present invention.

FIG. 4 shows an exemplary embodiment of a shape of the supporting member 100 provided in the backlight assembly according to the present invention.

The supporting member 100 shown in FIG. 4 includes the support 101 and the lamp fixing portions 103. In exemplary embodiments, the supporting member 100 may include other portions as necessary. FIG. 4 shows the number of lamp fixing portions 103 as four, but this is intended only to exemplify the present invention, and thus the present invention is not limited to this. In alternative embodiments, the number of lamp fixing portions 103 may be more or less than four.

The support 101 includes curved portions 101a, straight portions 101b, and a fixing portion 101c sequentially connected from the upper portion of the support 101. In exemplary embodiments, the support 101 may include other portions, as necessary. As shown in FIG. 4, the height h2 of the straight portions 101b is the largest among the height h1 of the curved portions 101a, the height h2 of the straight portions 101b, and the height h3 of the fixing portion 101c. In alternative embodiments, height h1 or height h3 may be the largest among heights h1, h2 and h3.

The curved portions 101a are positioned in an upper portion of the support 101. The curved portions 101a are curved and support the upper portion of the backlight assembly. The curved portions 101a may have a somewhat elastic force and may be curved because the support 101 may be made of resin. Advantageously, the upper portion of the backlight assembly can be efficiently supported. The curved portions 101a may be disposed apart from each other and formed side by side in the Y axis direction. The curved portions 101a may have a predetermined curvature and be curved in opposite directions. In exemplary embodiments, a radius of curvature of the curved portions 101a ranges from about 1 mm to about 100 mm. If the radius of curvature of the curved portions 101a is less than 1 mm, it may be difficult to manufacture a curved portion 101a in such a curved shape. If the radius of curvature of the curved portions 101a exceeds 100 mm, there may be no elastic force in the upper portion of the support 101 acting against a load from the display device 10. Permanent deformation may be generated.

Referring to FIG. 4, the straight portions 101b are connected to a lower end of the curved portions 101a and extend in a straight shape toward the base plate 105. In exemplary embodiments, a pair of straight portions 101b may be disposed apart from each other. The straight portions 101b may have a tilt angle α relative to a base plate 105 on which the support 101 is provided. In another exemplary embodiment, the tilt angle α of the straight portions 101b may range from about 60° to about 120°. Where the tilt angle α of the straight portions 101b is less than 60°, light may be prevented from emitting from the lamp 76 and a dark area may be generated in the backlight assembly 70 or the panel unit 50. Where the tilt angle α of the straight portions 101b is more than 120°, the sides of the support 101 may be in contact with each other by deflection and may be permanently deformed. In alternative embodiments, the tilt angle α of the straight portions 101b more than 90° and less than 120°, configures the support 101 having a narrow upper portion and a wide lower portion. This structure configuration allows a function of a supporting member. Essentially, the more apart the pair of straight portions 101b are disposed from the fixing portion 101c, the more the distance therebetween is increased. In another exemplary embodiment, the support 101 generally has a U shape.

Referring to FIG. 4, the fixing portion 101c is connected to a lower end of the pair of straight portions 101b and is fixed to the base plate 105 to firmly fix the straight portions 101b. The fixing portion 101c is firmly fixed to the base plate 105. The upper portion of the backlight assembly 70 may be elastically supported by the support 101. Advantageously, because a contact area between the curved portions 101a and the upper portion of the backlight assembly 70 is large, stress may be evenly distributed, even with movement.

The lamp fixing portion 103 may be positioned beside the support 101 includes a lamp support portion 103a and a lamp inserting portion 103b. In exemplary embodiments, the lamp fixing portion 103 may include other portions as are suitable for the purpose described herein.

An exemplary embodiment of a method of fixing a lamp with the lamp fixing portion 103 is provided as follows.

The lamp 76 is inserted into a pair of lamp inserting portions 103b. The lamp 76 is mounted on the lamp support 103a. Advantageously, sinking of the lamp 76 may be prevented, or effectively reduced. The lamp 76 may also be relieved from outside impact by firmly supporting the lamp 76 by this method. 76. The lamp support 103a connects both ends of the pair of lamp inserting portions 103b and supports, while enclosing a circumference of the lamp 76. A structure of the lamp fixing portion 103 may allow the lamp 76 to be easily attached and detached, as well as firmly fixed and supported in the display device 10.

Hereinafter, exemplary embodiments of the supporting member and the display device 10 according to the present invention will be described in detail with reference to FIGS. 5 to 11. The embodiments of the present invention are intended only to exemplify the present invention, and thus the present invention is not limited to the embodiments. Therefore, the present invention can be changed to other forms. Except for the structure of the support, the remaining structures of the exemplary embodiments of the present invention are the same as those of the earlier described exemplary embodiments of the present invention. Therefore, the same elements are indicated by the same reference numerals and detailed explanation will be omitted for convenience.

Figure 5:
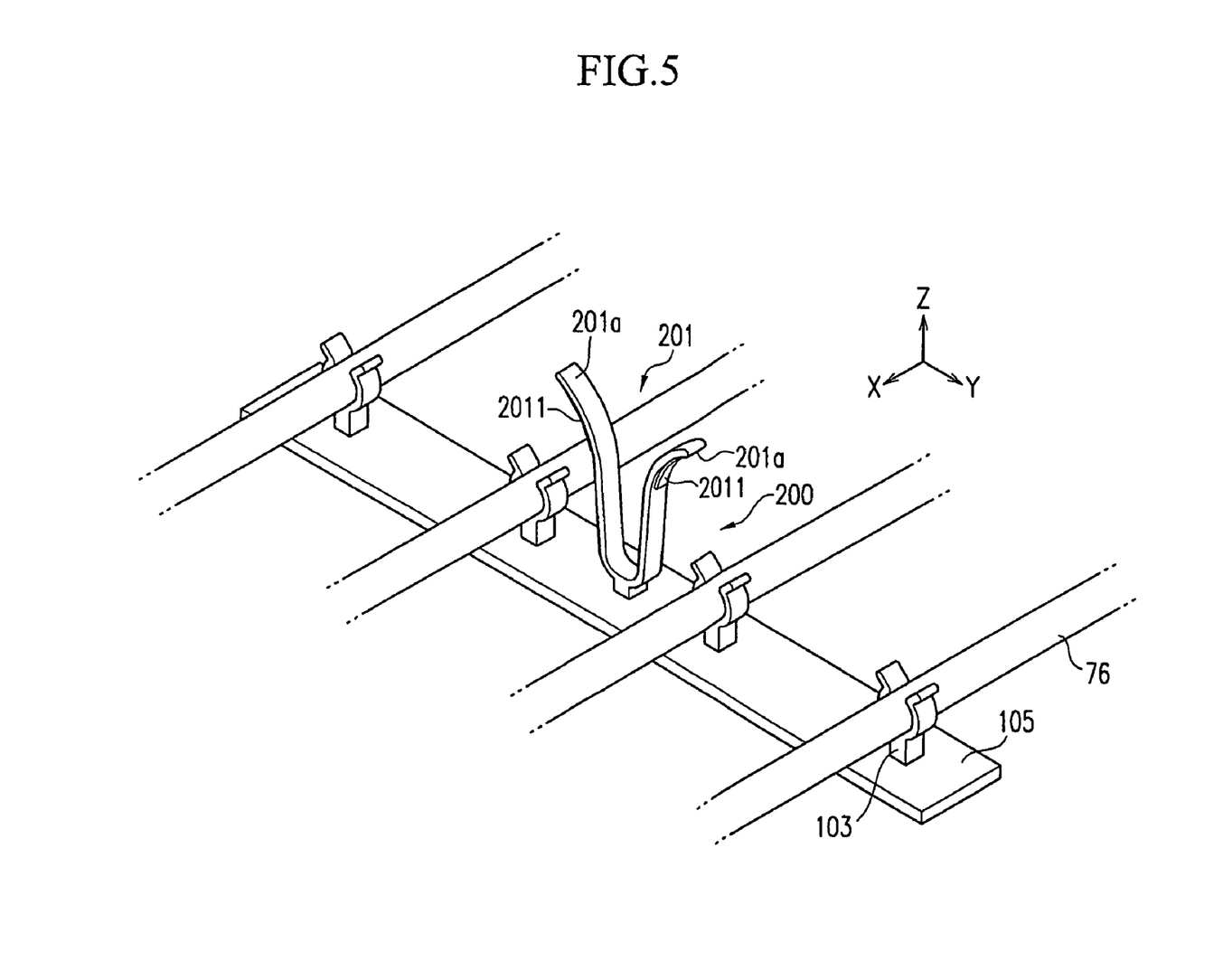
FIG. 5 is a perspective view of another exemplary embodiment of a supporting member provided in a backlight assembly according to the present invention.

FIG. 5 shows a supporting member 200 provided in the backlight assembly 70 according to another exemplary embodiment of the present invention.

In the supporting member 200, a pair of reinforcement boards 201l are attached onto the back surface of a pair of curved portions 201a provided in the support 201. Heavy bending of the curved portions 201a may be prevented, or effectively reduced, by attaching the reinforcement boards 201l on the back surface of the curved portions 201a. Advantageously, an elastic force of the curved portions 201a may be preserved. As a further advantage, deflection of the upper portion of the backlight assembly 70 may also be prevented, or effectively reduced.

Figure 6:
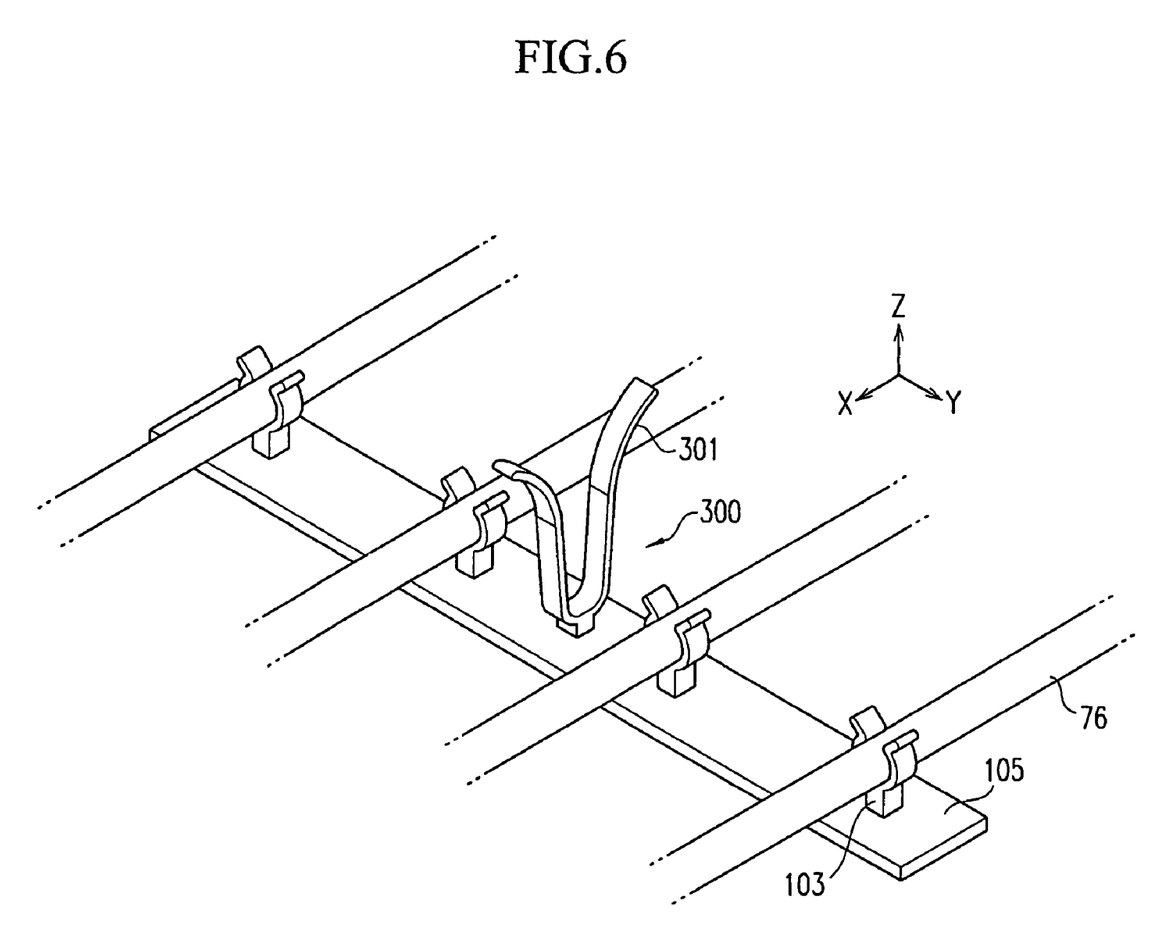
FIG. 6 is a perspective view of another exemplary embodiment of a supporting member provided in a backlight assembly according to the present invention.

FIG. 6 shows another exemplary embodiment of a supporting member 300 provided in the backlight assembly 70 according to the present invention.

In the supporting member 300, an upper portion of the support 301 is formed along the width direction (X axis direction) of the base plate 105. Advantageously, sinking of the upper portion of the backlight assembly 70 in the Y axis direction may be prevented or effectively reduced. In exemplary embodiments, Te backlight assembly 70 may have a pair of long sides and a pair of short sides. The plurality of lamps 76 may be provided to be parallel to the long sides. The backlight assembly may be deflected in the long side direction, such as in the Y axis direction. Advantageously, the supporting member 300 may prevent or effectively reduce the deflection of the backlight assembly 70 in the Y axis direction.

Although not shown in FIG. 6, in other exemplary embodiments, a respective pair of supports may be provided together in the longitudinal direction (X axis direction) and the width direction (Y axis direction) of the lamp. In alternative embodiments, a flower shape of support may be formed. The support may prevent the upper portion of backlight assembly 70 from sinking in all directions, that is, X axis direction and Y axis direction at the same time.

Figure 7:
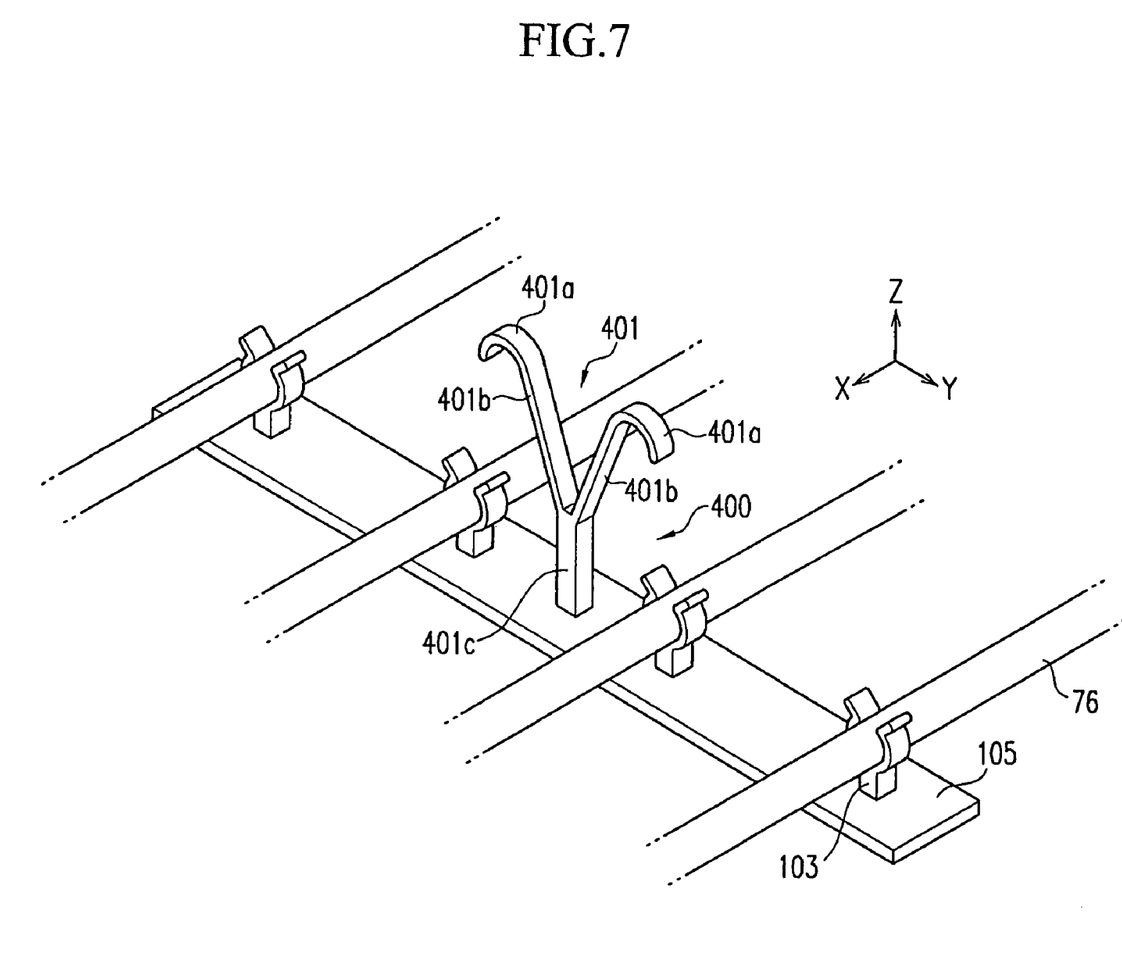
FIG. 7 is a perspective view of another exemplary embodiment of a supporting member provided in a backlight assembly according to the present invention.

FIG. 7 shows another exemplary embodiment of a supporting member 400 provided in the backlight assembly 70 according to the present invention.

The support 401 provided in the supporting member 400, generally speaking, has a Y character shape. The support 401 includes a pair of curved portions 401a, a pair of straight portions 401b, and a fixing portion 401c sequentially from the upper portion of the support 401. In exemplary embodiments, the support 401 may include other portions as necessary. The pair of curved portions 401a may be disposed apart from each other. The pair of curved portions 401a is curved to support the upper portion of the backlight assembly 70. The pair of straight portions 401b are connected to the lower end of the pair of curved portions 401a, respectively. The pair of straight portions 401b is connected at their lower ends, with the distance between them gradually narrows in a direction from an upper portion to a lower portion of the support 401. The fixing portion 401c is connected to the lower ends of the pair of straight portions 401b. The fixing portion 401c extends from the straight portions 401b and is fixed to the base plate 105. The fixing portion 401c extends in the Z axis direction and the pair of straight portions 401b is branched therefrom. Advantageously, the upper portion of the backlight assembly 70 is more firmly supported by the support 401.

Figure 8:
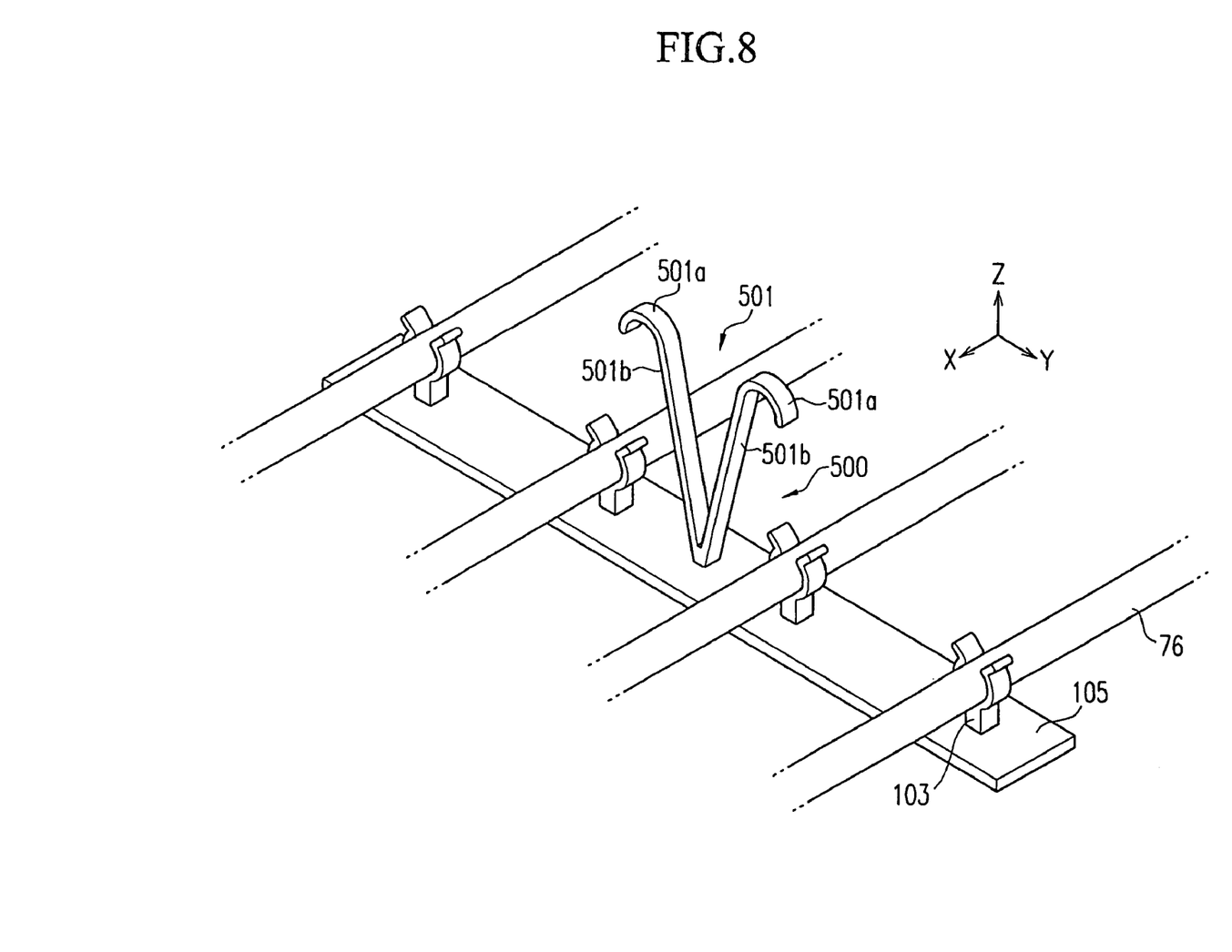
FIG. 8 is a perspective view of another exemplary embodiment of a supporting member provided in a backlight assembly according to the present invention.

FIG. 8 shows another exemplary embodiment of a supporting member 500 provided in the backlight assembly 70 according to the present invention.

The support 501 provided in the supporting member 500, generally speaking, has a V shape. The support 501 includes a pair of curved portions 501a and a pair of straight portions 501b sequentially from the upper portion of the support 501. In exemplary embodiments, the supporting member 500 may include other portions as necessary. The pair of curved portions 501a essentially supports the upper portion of the backlight assembly 70. The pair of straight portions 501b is connected to the lower end of the pair of curved portions 501a. Distance between the straight portions 501b gradually narrows in a direction from the upper portion of the support 501 toward the base plate 105. The pair of straight portions 501b is connected at their lower ends and are connected and fixed to the base plate 105.

Figure 9:
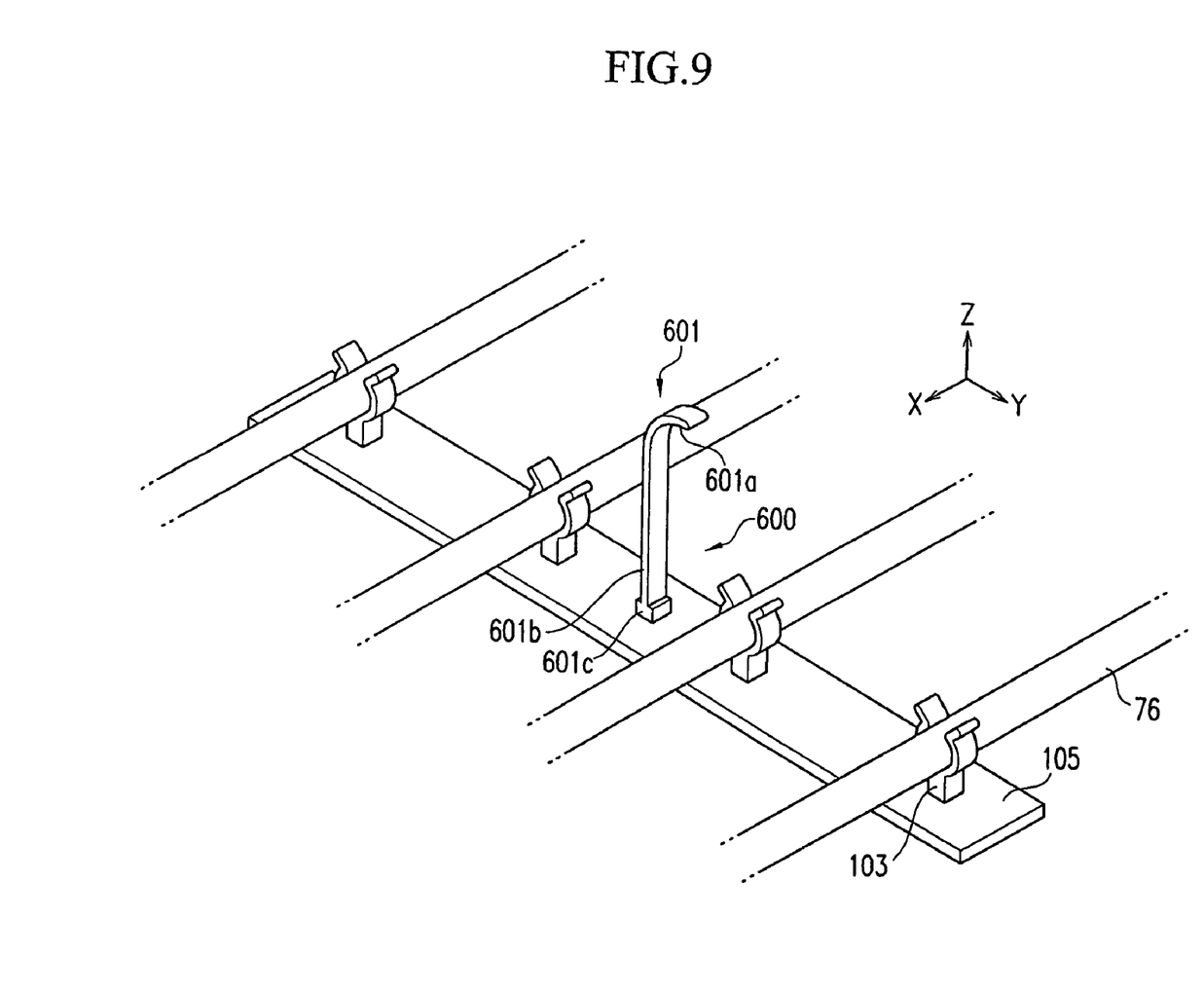
FIG. 9 is a perspective view of another exemplary embodiment of a supporting member provided in a backlight assembly according to the present invention.

FIG. 9 shows another embodiment of a supporting member 600 provided in the backlight assembly 70 according to the present invention.

A support 601 provided in the supporting member 600 has a straight shape and is the same as a shape of the supporting member 100 (shown in FIG. 1) cut in two in the Z axis direction. As shown in FIG. 9, if a size of the support 601 is reduced, the overall contour of the support 601 maybe less noticeable from the outside when displaying images. Advantageously, support 601 may be suitable for use in a small-sized display device 10. The support 601 may efficiently support the upper portion of the backlight assembly 70 because the support 601 includes an elastic curved portion 601a. The curved portion 601a is connected at an upper portion of the support 601 to a straight portion 601b. The straight portion 601b is shown in FIG. 9 connected at its lower end to a fixing portion 601c. The fixing portion 601c is fixed to the base plate 105, respectively fixing the support 601 to the base plate 105 of the display device 10.

Figure 10:
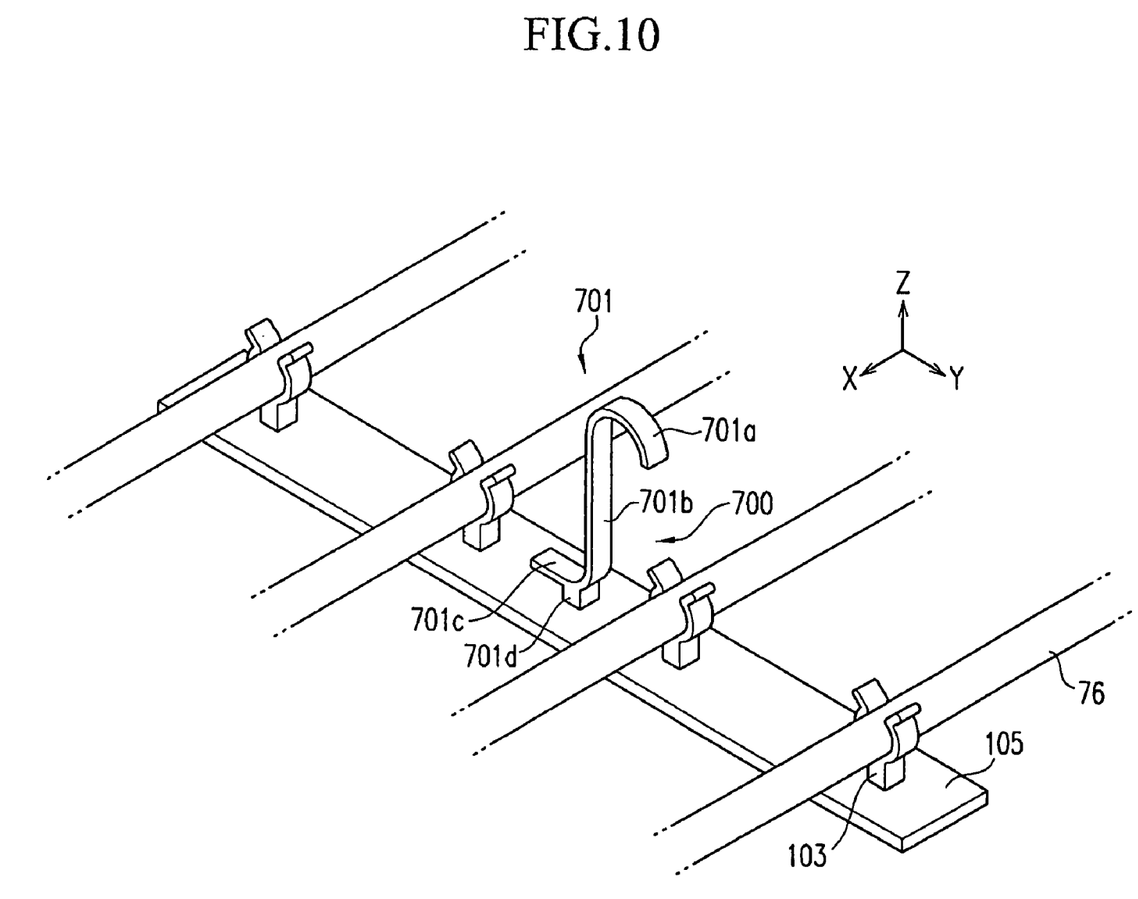
FIG. 10 is a perspective view of another exemplary embodiment of a supporting member provided in a backlight assembly according to the present invention.

FIG. 10 shows another exemplary embodiment of a supporting member 700 provided in the backlight assembly 70 according to the present invention.

The support 701 provided in the supporting member 700 shown in FIG. 10, generally speaking, has an L-character shape. The support 701 includes a curved portion 701a, a first straight portion 701b, a second straight portion 701c, and a fixing portion 701d. In exemplary embodiments, the support 701 may include other portions as necessary. The curved portion 701a essentially supports the upper portion of the backlight assembly 70. The first straight portion 701b is connected to the lower end of the curved portion 701a and extends in the Z axis direction, or, the direction toward the base plate 105. The second straight portion 701c is connected to the lower end of the first straight portion 701b and may extend substantially in parallel to the base plate 105 in the Y axis direction. The fixing portion 701d is connected to the lower portion of the second straight portion 701c and is connected and fixed to the base plate 105. Essentially, the support 701 firmly supports the upper portion of the backlight assembly 70.

Figure 11:
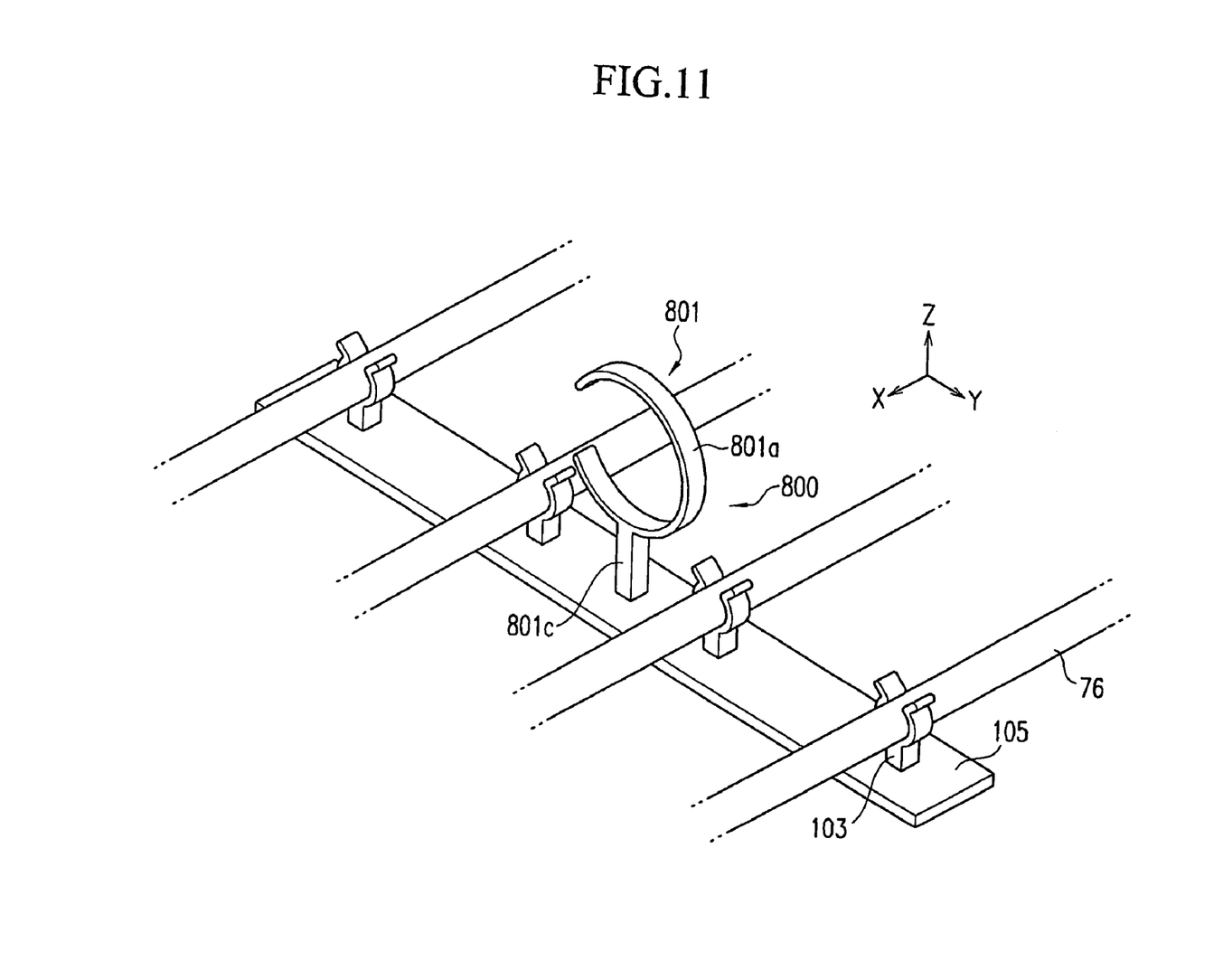
FIG. 11 is a perspective view of another exemplary embodiment of a supporting member provided in a backlight assembly according to the present invention.

FIG. 11 shows another exemplary embodiment of a supporting member 800 provided in the backlight assembly 70 according to the present invention.

The support 801 provided in the supporting member 800 shown in FIG. 11, generally speaking, has a C-character shape. The support 801 includes a curved portion 801a and a fixing portion 80c. In exemplary embodiments, the support 801 may include other portions as necessary.

The curved portion 801a generally may have a circular shape. One side of the circular shape of the curved portion 801a may be open in the Y axis direction. Even if a load is applied from the upper portion of the curved portion 801a, the load at the outside, or un-opened part of the curved portion 801a, is lessened since one side thereof is open. Advantageously, the curved portion 801a may elastically support the upper portion of the backlight assembly 70. The curved portion 801a may also withstand a load from the outside part of the curved portion 801a. The fixing portion 801c is connected to the lower portion of the curved portion 801a and connected and fixed to the base plate 105. Essentially, the upper portion of the backlight assembly 70 is firmly supported.

In another exemplary embodiment, the backlight assembly 70 may be used in a display device 10 by combining the backlight assembly 70 to the panel unit 50. A load may increase because the panel unit 50 is positioned above the backlight assembly 70. These disadvantages may be fundamentally overcome by supporting the upper portion of the backlight assembly 70 with an elastic supporting member.

Although the exemplary embodiments of the present invention have been described, it can be obviously understood by those skilled in the art that the present invention may be modified in various forms without departing from the spirit and scope of the appended claims.

What is claimed is:

1. A backlight assembly comprising:
a lamp for emitting light; and
a supporting member comprising a base plate and a support fixed on the base plate, the support extending in a light emitting direction and having a predetermined height,
wherein an upper portion of the support elastically supports an upper portion of the backlight assembly and is curved, and
wherein the support comprises:
a pair of curved portions supporting the upper portion of the backlight assembly;
a pair of straight portions connected to a lower end of the curved portions and extending to the base plate; and
a fixing portion connected to a lower end of the straight portions and fixed to the base plate.

2. The backlight assembly of claim 1, wherein the pair of curved portions are spaced from each other and the pair of straight portions are spaced from each other.

3. The backlight assembly of claim 1, wherein a radius of curvature of the curved portions ranges from about 1 mm to about 100 mm.

4. The backlight assembly of claim 1, wherein the pair of curved portions are curved in opposite directions.

5. The backlight assembly of claim 1, wherein the pair of straight portions form a tilt angle relative to the base plate and a distance between the pair of straight portions is gradually increased in a direction away from the fixing portion.

6. The backlight assembly of claim 5, wherein the tilt angle ranges from about 60° to about 120°.

7. The backlight assembly of claim 1, wherein the support further comprises a reinforcement board attached to a back surface of the curved portions.

8. The backlight assembly of claim 1, further comprising optical sheets and a diffusing plate provided in the upper portion of the backlight assembly, wherein the support contacts the diffusing plate.

9. The backlight assembly of claim 1, wherein the supporting member further comprises a lamp fixing portion disposed on the base plate.

10. The backlight assembly of claim 9, wherein the lamp fixing portion comprises:
a pair of lamp inserting portions configured to receive the lamp; and
a lamp support connected to the pair of lamp inserting portions, the lamp support configured to support and encloses the lamp.

11. The backlight assembly of claim 1, wherein the support comprises:
a pair of curved portions supporting the upper portion of the backlight assembly and spaced apart from each other;
a pair of straight portions connected to lower ends of the pair of curved portions and connected to each other at lower ends thereof, wherein a distance between the pair of curved portions is narrowed in a direction from an upper portion of the straight portions to a lower portion of the straight portions; and
a fixing portion connected to the lower ends of the pair of straight portions and extending toward the base plate, wherein the fixing portion is configured for fixing to the base plate.

12. The backlight assembly of claim 1, wherein the support comprises:
a pair of curved portions spaced apart from each other configured to support the upper portion of the backlight assembly; and
a pair of straight portions connected to lower ends of the pair of curved portions and connected to each other at lower ends thereof, wherein a distance between the pair of curved portions narrows in a direction from an upper end of the straight portions to a lower end of the straight portions, the straight portions configured for fixing to the base plate at the lower end of the straight portions.

13. The backlight assembly of claim 1, wherein the support comprises:
a curved portion supporting the upper portion of the backlight assembly;
a first straight portion connected to a lower end of the curved portion and extending to the base plate;
a second straight portion connected to the lower end of the first straight portion and extending substantially parallel to the base plate; and
a fixing portion connected to a lower portion of the second straight portion and fixed to the base plate.

14. The backlight assembly of claim 1, wherein the support comprises:
a curved portion supporting the upper portion of the backlight assembly, the curved portion formed in a substantially circular shape and having an open portion; and
a fixing portion connected to a lower portion of the curved portion and fixed to the base plate.

15. The backlight assembly of claim 1, wherein the curved upper portion of the support extends in the width direction of the base plate.

16. The backlight assembly of claim 1, wherein the support comprises:
a straight portion connected to a lower end of the curved portion and extending to the base plate; and
a fixing portion connected to a lower end of the straight portion and fixed to the base plate.

17. The backlight assembly of claim 1, wherein the curved upper portion of the support extends in the longitudinal direction of the base plate.

18. A display device comprising:
a panel unit displaying an image; and
a backlight assembly supplying light to the panel unit,
wherein the backlight assembly comprises a lamp for emitting light and a supporting member comprising a base plate and a support fixed on the base plate, the support extending in a light emitting direction with a predetermined height,
wherein an upper portion of the support elastically supports an upper portion of the backlight assembly and is curved, while contacting the upper portion of the backlight assembly,
wherein the support comprises:
a straight portion connected to a lower end of the curved portion and extending to the base plate; and
a fixing portion connected to a lower end of the straight portion and fixed to the base plate, and
wherein the curved portion includes a pair of curved portions spaced from each other and the straight portion includes a pair of straight portions which are spaced from each other.

19. The display device of claim 18, wherein the pair of curved portions are curved in opposite directions.

20. The display device of claim 18, further comprising optical sheets and a diffusing plate provided in the upper portion of the backlight assembly, wherein the support contacts the diffusing plate.

21. The display device of claim 18, wherein the pair of straight portions form a tilt angle relative to the base plate and a distance between the pair of straight portions gradually increases in a direction from the base plate toward an upper end of the straight portions.

22. The display device of claim 18, wherein the panel unit includes a liquid crystal display panel.

* * * * *